United States Patent
Claudatos et al.

(10) Patent No.: US 9,152,706 B1
(45) Date of Patent: Oct. 6, 2015

(54) ANONYMOUS IDENTIFICATION TOKENS

(75) Inventors: Christopher Hercules Claudatos, San Jose, CA (US); William Dale Andruss, Edina, MN (US); Michael John Dutch, Saratoga, CA (US)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 13/617,862

(22) Filed: Sep. 14, 2012

Related U.S. Application Data

(63) Continuation-in-part of application No. 12/165,615, filed on Jun. 30, 2008, now abandoned, and a continuation-in-part of application No. 11/648,071, filed on Dec. 30, 2006, now abandoned, and a continuation-in-part of application No. 12/165,612, filed on Jun. 30, 2008.

(60) Provisional application No. 61/054,419, filed on May 19, 2008.

(51) Int. Cl.
*G06F 17/30* (2006.01)

(52) U.S. Cl.
CPC ................... *G06F 17/3079* (2013.01)

(58) Field of Classification Search
CPC .................................... G06F 17/3079
USPC ........................................ 707/698
See application file for complete search history.

(56) References Cited

U.S. PATENT DOCUMENTS

| | | | |
|---|---|---|---|
| 5,274,631 A | 12/1993 | Bhardwaj | |
| 5,933,818 A | 8/1999 | Kasravi et al. | |
| 6,026,167 A | 2/2000 | Aziz | |
| 6,370,247 B1 | 4/2002 | Takaragi et al. | |
| 6,522,726 B1 | 2/2003 | Hunt et al. | |
| 6,587,831 B1 | 7/2003 | O'Brien | |
| 6,950,434 B1 | 9/2005 | Viswanath et al. | |
| 6,959,384 B1 | 10/2005 | Serret-Avila | |
| 6,996,251 B2 * | 2/2006 | Malone et al. | 382/100 |
| 7,248,680 B1 | 7/2007 | Gainsboro | |
| 7,424,744 B1 | 9/2008 | Wu et al. | |
| 7,443,321 B1 | 10/2008 | Kaufman et al. | |
| 7,457,745 B2 | 11/2008 | Kadambe et al. | |
| 7,600,125 B1 | 10/2009 | Stringham | |
| 7,634,657 B1 | 12/2009 | Stringham | |
| 7,676,688 B1 | 3/2010 | Hardman | |
| 8,572,059 B2 * | 10/2013 | Britton et al. | 707/705 |
| 2001/0036821 A1 | 11/2001 | Gainsboro et al. | |
| 2002/0010797 A1 | 1/2002 | Moulton | |
| 2002/0071537 A1 | 6/2002 | Gainsboro | |
| 2002/0080013 A1 * | 6/2002 | Anderson et al. | 340/425.5 |
| 2004/0025025 A1 * | 2/2004 | Venkatesan et al. | 713/176 |
| 2004/0073617 A1 | 4/2004 | Milliken et al. | |
| 2005/0022031 A1 | 1/2005 | Goodman et al. | |
| 2005/0276385 A1 | 12/2005 | McCormick | |
| 2006/0059173 A1 | 3/2006 | Hirsch et al. | |
| 2006/0085855 A1 | 4/2006 | Shin et al. | |

(Continued)

*Primary Examiner* — Alexey Shmatov

(74) *Attorney, Agent, or Firm* — Staniford Tomita LLP

(57) ABSTRACT

Surveillance data is received from a source such as a traffic camera. The data is hashed and the signature is stored in a database. The data itself may be discarded after it is hashed. In an embodiment, extrinsic information such as time and location are associated with the signature. Identification data may be received and hashed. The signature belonging to the identification data may be compared to the database to determine if there is any matching surveillance data. If a match is found, the extrinsic information may be returned.

17 Claims, 11 Drawing Sheets

(56) References Cited

U.S. PATENT DOCUMENTS

| | | |
|---|---|---|
| 2006/0111904 A1 | 5/2006 | Wasserblat et al. |
| 2006/0115061 A1 | 6/2006 | Wilson et al. |
| 2006/0179141 A1 | 8/2006 | John et al. |
| 2007/0180275 A1 | 8/2007 | Metzger et al. |
| 2007/0220023 A1 | 9/2007 | Dean et al. |
| 2007/0253608 A1 * | 11/2007 | Tulyakov et al. ............. 382/125 |
| 2007/0256129 A1 | 11/2007 | Jung et al. |
| 2008/0008302 A1 | 1/2008 | Yim |
| 2008/0134331 A1 | 6/2008 | Sung Won et al. |
| 2008/0205273 A1 | 8/2008 | Wackerly |
| 2009/0268632 A1 | 10/2009 | Pabari et al. |
| 2010/0031024 A1 * | 2/2010 | Hayes ........................... 713/156 |

* cited by examiner

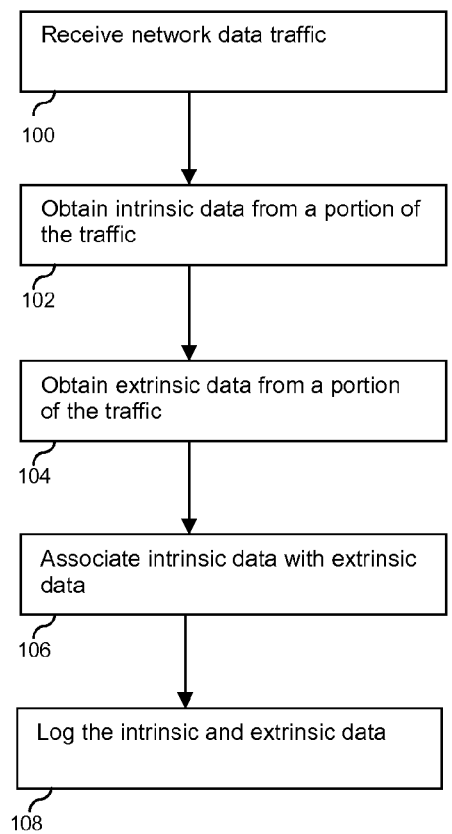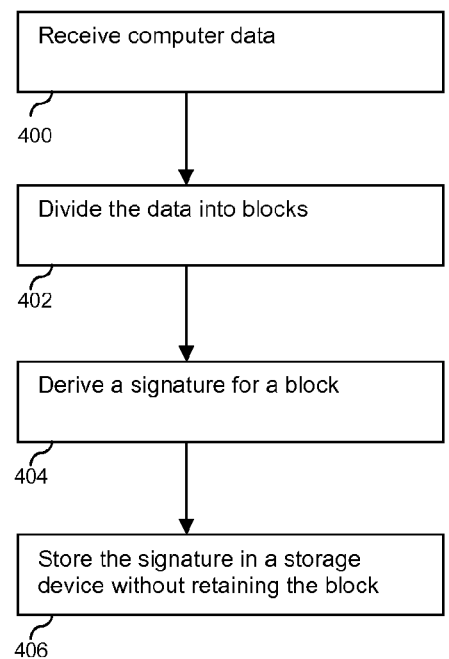
FIG. 3
FIG. 4

ANONYMOUS IDENTIFICATION TOKENS

CROSS REFERENCE TO RELATED APPLICATIONS

This application is a continuation in part of U.S. patent application Ser. No. 11/648,071 for NETWORK MONITORING filed Dec. 30, 2006, now abandoned which is incorporated herein by references for all purposes. This application is also a continuation in part of U.S. patent application Ser. No. 12/165,615 for GLOBAL COMMONALITY DISCOVERY AND LOGGING filed Jun. 30, 2008, now abandoned which is incorporated herein by reference for all purposes. This application is also a continuation in part of co-pending U.S. patent application Ser. No. 12/165,612 for GLOBAL COMMONALITY AND NETWORK LOGGING filed Jun. 30, 2008 which claims priority to U.S. Provisional Patent Application No. 61/054,419 for GLOBAL COMMONALITY DISCOVERY AND LOGGING filed May 19, 2008, which are incorporated herein by reference for all purposes.

FIELD OF THE INVENTION

This invention relates generally to storing surveillance data, and more particularly to systems and methods for anonymously storing surveillance data with extrinsic information.

BACKGROUND OF THE INVENTION

This invention relates to a system and method for logging and tracking data at various locations and tracking movement of data. Business and legal requirements may require monitoring of network data traffic, which may include data packets flowing across the network. For example, anti-terrorism laws may require an Internet Service Provider (ISP) to maintain logs of all Internet traffic of its customers for a prescribed time period. The goals of such laws are to assist law enforcement agencies to investigate potential terrorist activities, including planning and financing. Other goals may include investigating potential lawbreakers and thwarting child pornographers and other internet predators. Investigations into illicit behavior are often hampered because such log data is routinely deleted in the normal course of business. Furthermore, the value of the current log is limited due to the fact that it contains very basic metadata (data about data) and nothing about the data traffic payload. Corporations may use this data to help them better manage their networks and to identify anomalous or unwanted network traffic. This data, however, is subject to the same limitations as described above.

Storing the entire network traffic is technically feasible, but this approach would come at great cost in terms of storage and archival. In addition, the laws of some countries may prohibit inspection of people's data without court approval or other authorization on a case by case basis. Furthermore, even if the entire traffic data were retained, there is no method to efficiently and effectively search the data. In the US, legislation has been enacted and new legislation is proposed to permit limited surveillance in the form of logging. Such logging may keep the names of an ISP's customers and their IP addresses, the IP addresses of the sites to which they connected, and the dates and times of their connections. Because the goal is investigative, the paucity of data limits the value of the log. For example, if investigators were to have the entire network traffic available for inspection, including the payload, the quality of their data would improve significantly, thus aiding their investigation. However, this is not feasible, due to various laws prohibiting such surveillance. In corporate use, the cost associated with storing all network traffic may not be justifiable.

With the proliferation of computer and communication systems there has been a significant increase in the amount of data within systems. There has also been a tremendous increase in the amount of data copied, moved, or shared between systems. As the adoption of these systems grows, the amount of data handled by and through them also increases. They become more essential to the operation, control, and management of an endless variety of use-cases including but not limited to personal, business, and governmental applications. Because of their greater use and high concentration of data-value they become targets of criminal attack and vehicles for unwanted and unauthorized activities. For example, a system may contain or handle a large amount of financial data. Due to this concentration of data, the system becomes a high-value target for criminal exploitation. Another example is that systems are being operated by criminals, vandals, terrorists, and so on, for the purpose of planning or carrying out their criminal activities such as the trade in child pornography, terrorist planning, illegal gambling, drug trafficking, and so on. Another example is that the systems of unsuspecting victims are being hijacked without authorization through remote means and used as vehicles through which further bad acts can be perpetrated.

Another example is that systems in the workplace are being used for a blend of personal and business reasons. This is a common use-case which most companies explicitly or tacitly approve of Even so, companies are being compelled by legislation to take responsibility for all communications and computer data traffic generated or made by company personnel whether or not such communications are authorized, internal, external, or personal. As an example, stock brokerages must take responsibility for the communications between their traders and their customers. Also, companies must be able to determine if any inappropriate activities are going on within their workplace. This can range from offensive language used in emails between employees to the use of company systems to store and distribute illegal copies of music, video, texts, books, and software.

In addition, there is an added challenge to logging which is the issue of privacy. Most countries have laws which respect and protect the privacy of their citizens. As such, it is typically impossible for law enforcement officials to monitor citizen data without a court order. While this restriction may help protect the privacy of the citizenry, it also blunts the benefits of such logging and investigation. Until now, the challenge has been to find sufficient evidence of wrongdoing so that a search warrant can be justified. The means for producing sufficient evidence would benefit from deep inspection into the content of data objects but this is specifically prohibited without a search warrant.

There is a need, therefore, for an improved method, article of manufacture, and apparatus for monitoring data.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a flowchart illustrating a process for analyzing traffic in some embodiments of the invention;

FIG. 4 is a flowchart illustrating a process for processing data in some embodiments of the invention;

DETAILED DESCRIPTION

Figure 1:
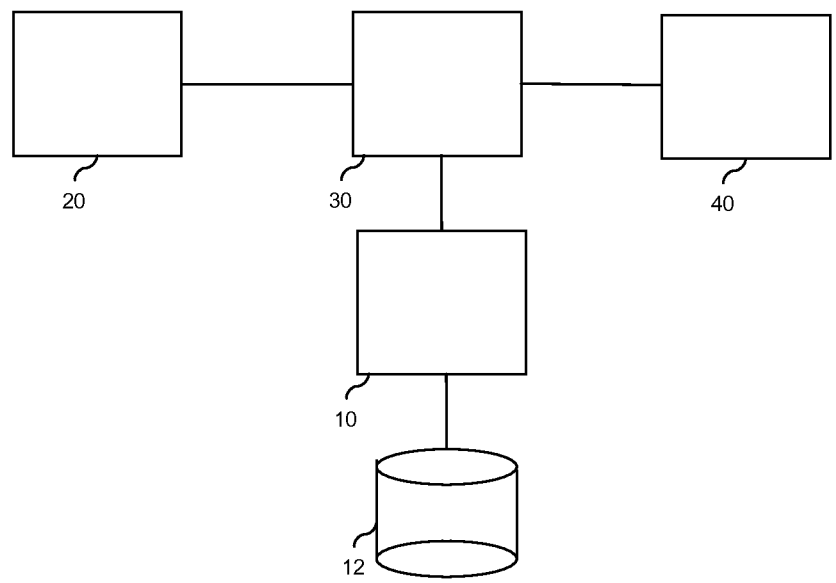
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which a network traffic analysis program executes, but it should be understood that the principles of the invention are not limited to this particular configuration. Rather, they may be applied to any system in which data exists, or in which network traffic is scanned or transmitted, either on a local or remote device, and the system may comprise one or more devices. Although the methods herein are described in terms of their application to Internet network data traffic analysis, one skilled in the art will recognize that they are equally applicable to other cases for which it is desirable to track data, including but not limited to internal corporate networks. For example, clients may be placed on various machines to analyze data and communicate with a server. Disclosed herein are a method and system to log and archive data at various locations and data traffic, such as Internet traffic, in such a manner as to make the log searchable and relevant to various investigations without storing the actual data (content) or necessarily providing the surveilled payload to any parties. Also disclosed are methods of discovering within single and multiple systems or in transit between systems, the existence of data objects and their location, their transmission and copy history, their genealogy, their chain of custody, and the determination of the similarity of one data object or portions thereof to another, and keeping a record of such information.

Methods may be provided to create and maintain usage logs for logging system and network data. These logs may capture source and destination IP addresses, time, date, protocol used, amount of data sent/received, and possibly account owner information (at least from one side of the communication channel). Such approaches may provide log information about a single site, a single system, or a specified communications channel. In order to discover correlations among data from multiple sites/systems and to identify who or which system had/has a given data object or engaged in a data interaction of a certain protocol (such as VoIP calls), the logs must be aggregated, searched, and analyzed as a post-logging process. Post-logging operations would need to be performed every time new information was added and every time new correlations between data were suspected. These efforts consume time and resources and because they are part of a post-process operation there is no ability to learn of the occurrences and correlations in or near real-time. The use of commonality factoring as disclosed herein provides enhanced functionality.

Figure 2:
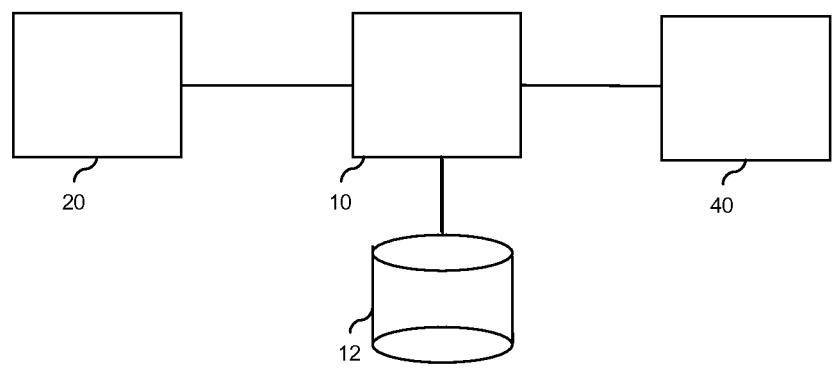
FIG. 2 is a diagram of an embodiment of a system in accordance with the invention.

FIG. 1 illustrates a configuration in which a network traffic monitoring system comprising a network traffic analysis program executing on a computer system 10 could be used to scan network data traffic. As shown in FIG. 1, a network tap 30 may be used, in which a passive data tap is placed in the data path between host 20 and host 40, and all traffic flowing through the tap 30 is visible to the monitoring system 10. Common networking mirroring methods may be used, in which network traffic is essentially "cloned" and the cloned traffic is via a monitoring port to the monitoring system 10 or an IP address for the monitoring system 10. A storage device 12 is provided for storing data from the monitoring system 10. In some embodiments, an active tap may be placed inline with the traffic, thereby acting as a "man-in-the-middle." In this configuration, the active tap may control the flow of traffic as well as monitor all traffic that flows through it. The functionality of the network tap and monitoring system may be combined into one system 10, as shown in FIG. 2. It should be understood that the above methods are presented by way of illustration and are not intended to be limiting. Various methods of monitoring network data traffic may be used, singly or in combination, without departing from the spirit of the invention. For example, other components may be added to the configuration of FIG. 1 to perform functionality of the monitoring system 10. Storage can be provided in a variety of ways, such as through a NAS (network attached storage), a SAN (storage area network), or other configuration.

The network traffic monitoring system 10 may be used to process network traffic as will be described herein. In some embodiments, data may be collected by the monitoring system 10 directly from the network data traffic. This information may be considered "intrinsic" in that the information is extractable from the packets directly (such as by inspection of the packet headers) and is intended to be understood by common network equipment. Some processing may be involved, such as the determination of the packet's beginning and end points, its type (such as TCP or UDP, etc.), and the relevant subset of data within the packet (such as source address). Such intrinsic data may include source address, destination address, source MAC (Media Access Control) address, destination MAC, protocol, route taken, time/date, packet size, bandwidth, physical port number, logical port number, etc.

Data may be determined from examination of the network data traffic payload; e.g., content derived metadata. This information may be considered to be "extrinsic" in that the data has no intended meaning to common network equipment such as switches, routers, network interface cards, etc., and the data may reside in a combination of locations such as the packet header and the payload. Extrinsic data may include information about the following:

1. Application—indicates the application(s) associated with the network traffic. Examples: Kazaa, Skype, IM, email, file sharing, video conferencing, VoIP, etc. This may be determined by examining the payload and detecting characteristics unique to the application generating the traffic. Various techniques may be used to determine traffic type, such as those used in firewalls and network intrusion detection/protection systems. Some techniques may be based on the association of applications to specific ports or a sequence of ports. Others may use byte pattern matching. Techniques beyond port matching may be used because some applications do not have fixed port associations or they intentionally use ports associated with other applications in order to disguise their identity (such as when traffic is encapsulated over HTTP in order to pass through firewalls). Other techniques may be based on packet length, inter-arrival times, flow characteristics, etc., and combinations of multiple techniques may be used. Some applications may be easily identified if they embed an identifier in their packet header. Thus, various techniques of sniffing traffic may be used to identify traffic such as file transfers and then extract the additional data such as file name, date, etc.
2. File and object types—are there files or objects being transferred? If so, what file or object types are being used? Examples: document files (.doc, .pdf), image files (.bmp, .gif), multimedia files (.jpeg, .wav, .avi), database objects, data streams, etc.
3. Event Data—this may be considered a subset or more detailed aspect of Application data. For example, video cameras may also have event triggering capabilities where a data signal is sent based on a physical or video event (such as a door opening or movement within a certain region of the viewed area), or based on alarm signals. Derivation of event data may be performed using similar techniques for deriving application data.
4. Hash signature—when files or objects are being transferred, create a hash of the file. Various hash algorithms may be used, such as Secure Hash Algorithm or MD5.
5. Location—render the apparent geophysical location of all parties. This may be performed, for example, by lookup of an IP address's registration. In some embodiments, the lookup can be combined with (or compared to) the subscriber's address on file with the ISP. Additionally or alternatively, EXIF geo-tagging data may be extracted from multimedia data such as digital audio or images. Geo-tagging data may add location information unrelated to the source or destination of the transmitted data. Instead, the location may be a location which the person at the source has been, intends to go, or otherwise has an interest in. In an embodiment, the location may also be extracted from information transmitted in a recognizable format. For example, the location may be an address contained in the content of the transmitted data. Similarly, the information may be v-card information.
6. Encryption—determine if the traffic is encrypted or otherwise unknown/unknowable. Encrypted traffic may be identified by the use of an encrypted traffic protocol such as HTTPS. Some traffic may not "self-identify" as encrypted, and various techniques may be used to identify such traffic. In some embodiments, the entropy of the traffic's payload is measured to determine whether it is encrypted, and may need to be distinguished from other high entropy data types such as image files, compressed files, etc.
7. Identity—determine whether identity information is contained within the payload. In some embodiments, a speaker recognition system may be used to examine voice data traffic (or other audio elements within other formats such as audio files, video files, etc.) to determine the identity of the speakers. Such identification may be permissible because the identity of the users is given. In some embodiments, a facial recognition system may be used with video or image traffic to determine the identities of people depicted. In some embodiments, object recognition may be used with video or other image formats in order to determine what objects are depicted, such as structures that might be considered high-profile targets.
8. Language—analyze text and audio elements to determine which languages are being used in the traffic. This may be done by attempting to match portions of the traffic to text and audio elements in lexicons for various languages. This information may also be used to determine location. A specific language, accent, or dialect may suggest the information originated in location where such speech is commonly used. Similarly, slang terms, place names, or organization names may all be used to identify a likely location.
9. Phonic Profile—determine if the traffic contains any of many types of sounds such as blasts, gunshots, crying, laughing, glass breaking, etc. This may be done by using an auditory recognition system to analyze the traffic.
10. Locale—determine the locale depicted in traffic containing images by applying image recognition systems against the traffic.
11. Word Spotting—determine if specific words were spoken by applying a word spotting system against the traffic.

Network traffic monitoring system 10 may additionally or alternatively apply policies to the traffic. These policies may treat the traffic differently based on its intrinsic or extrinsic data. For example, traffic containing a gunshot phonic profile from a high crime location may be flagged for review. These policies may be dynamically based on the intrinsic or extrinsic data, or may be statically defined by a user or system. A static policy may, for example, raise an alert every time a gunshot is identified regardless of the value of the other intrinsic or extrinsic parameters.

Turning now to FIG. 3, process flow consistent with some embodiments is shown. As shown, the process includes receiving network data traffic in step 100. Intrinsic data is obtained from a portion of the data traffic, step 102, such as by inspection of packet headers in the portion examined. Extrinsic data is obtained from a portion of the data traffic, step 104, by analyzing its payload. In some embodiments, the extrinsic data may be obtained from the same portion of data traffic from which the intrinsic data is obtained, though it may be useful in some cases to obtain intrinsic and extrinsic data from different portions of the traffic. In step 106, the intrinsic data is associated with the extrinsic data, and the intrinsic data and extrinsic data are logged, step 108.

The extrinsic data derived from examination of the network data traffic payload or from clients at various systems may be analyzed using commonality factoring, a well-known technique used for de-duplicating data to reduce storage requirements. Multiple methods may be used to achieve these results. Generally, these methods split data objects into smaller blocks of data with either fixed or variable lengths. These blocks are then rendered through a hash function (such as a cryptographic hash algorithm) into unique numerical sequences ("hashes") which represent each unique block. Because the hash function deterministically renders identical blocks with the same hash, it is possible to determine if blocks are identical or different simply by comparing the hashes. If the hashes match, they are identical. If the hashes do not match, the blocks are different.

Commonality factoring may be performed at the source of the data or at the data's destination. In the case of storing data for backup purposes, the workflow can first require the source data to be backed up to the backup destination. The data may be reduced through commonality factoring once it is at the backup destination. If commonality factoring is applied at the source, duplicate data may be identified before transmission to the backup target. This eliminates the need to transmit duplicate backup data to the backup target, thus saving bandwidth and time.

Commonality factoring may involve several components: the source data, the various blocks of data which comprise the source data (repository of source blocks), the hashes that uniquely identify the blocks, the collection of pointers to the hashes which collectively represent the source data in its original form, the index of the hashes, and metadata which describes other aspects of the original source data such as the filename, timestamp, pathname, file owner, etc.

As more data is processed through the commonality factoring engine, the existence of duplicate blocks of data is identified. Through this identification it is possible to achieve significant reductions in the amount of bandwidth required for data transmission and the amount of storage space for storing the data.

The commonality factoring process creates a rendition of the original data that is unreadable and incomprehensible to humans unless each hash within the sequence of hashes that represents the file (or object) is associated with its respective source block of data. Through this association, the data may be restored or reconstituted to its original state. If the hashes are separated from and no longer associated to the repository of source blocks, the source data object will remain unknowable from the hashes. This means that there is no way to know the contents of or reconstruct the original data object without the source data blocks.

These approaches are useful for reducing the amount of data stored and transmitted by eliminating redundant data at the file level and the sub-file level. These methods work with data within a single system or across multiple systems. In other words, data that is found to be redundant when compared to all the data contained at its own source can be eliminated as well as data which is found to be redundant when compared to all the data from all other systems within the affected domain. For example, if a single computer contains hundreds of identical data objects ("Block-A") then only one copy of Block-A needs to be transmitted and stored. In another example, if multiple computers each contain one or more of Block-A then only one copy of Block-A needs to be transmitted and stored. In this case even greater efficiency is achieved.

Commonality factoring may be used to identify commonality of sub-data-object elements and applied to data logging. As data traffic is sent and received through a network, data logs may be generated. Commonality factoring is applied to the network data. Network data streams may be divided into blocks that are hashed and stored as described herein. The complete data stream may be captured and stored, or a portion or even none of the data stream may be captured and stored. The data stream may be permitted to continue to its intended destination, stopped from reaching its intended destination, diverted from reaching its intended destination, cloned (a copy of the data stream is sent to a destination other than the intended destination), or some combination of these, as described herein. In some embodiments, the data stream may not be retained, but simply analyzed and allowed to continue to its intended destination. Blocks may be discarded (i.e., they are not kept by the monitoring system, though they may be allowed to continue to their destination on the network). In some embodiments, policies may be applied to restrict the data stream based on some data in the stream, which may be determined by matching hashes. For example, if a file is known to be contraband (such as child pornography or a confidential or classified document), and has been rendered into blocks with signatures for each, a data stream could be intercepted/blocked based on matching at least some of the prohibited hashes to hashes from the data stream. The matching of prohibited hashes may be flagged for review by another party, such as law enforcement or an administrator.

In some embodiments, identical blocks are not stored again but instead, pointers to the redundant blocks may be maintained together with necessary metadata that permits proper reconstitution of the reduced data. In some embodiments, identical hashes of blocks are not stored again, but instead, pointers to existing hashes may be maintained, and associated with necessary metadata, such as intrinsic data from the network traffic. Information regarding sequencing of blocks may be stored, or implicit in the timestamps. These methods may be applied to all traffic where network logging is required. Since commonality factoring may be applied across multiple sources (including non-transitory sources such as data storage), the same holds true here and network streams from a plurality of sources and destinations, as well as data from repositories, may be logged and/or stored.

The following figures are illustrative of some embodiments described herein. FIG. 4 is a flowchart illustrating an embodiment of a process for processing computer data. In step 400, computer data is received. The data is then divided into blocks, step 402. A signature is then derived for each block, step 404. The signatures are then stored in a storage device without retaining the block, step 406.

Figure 5:
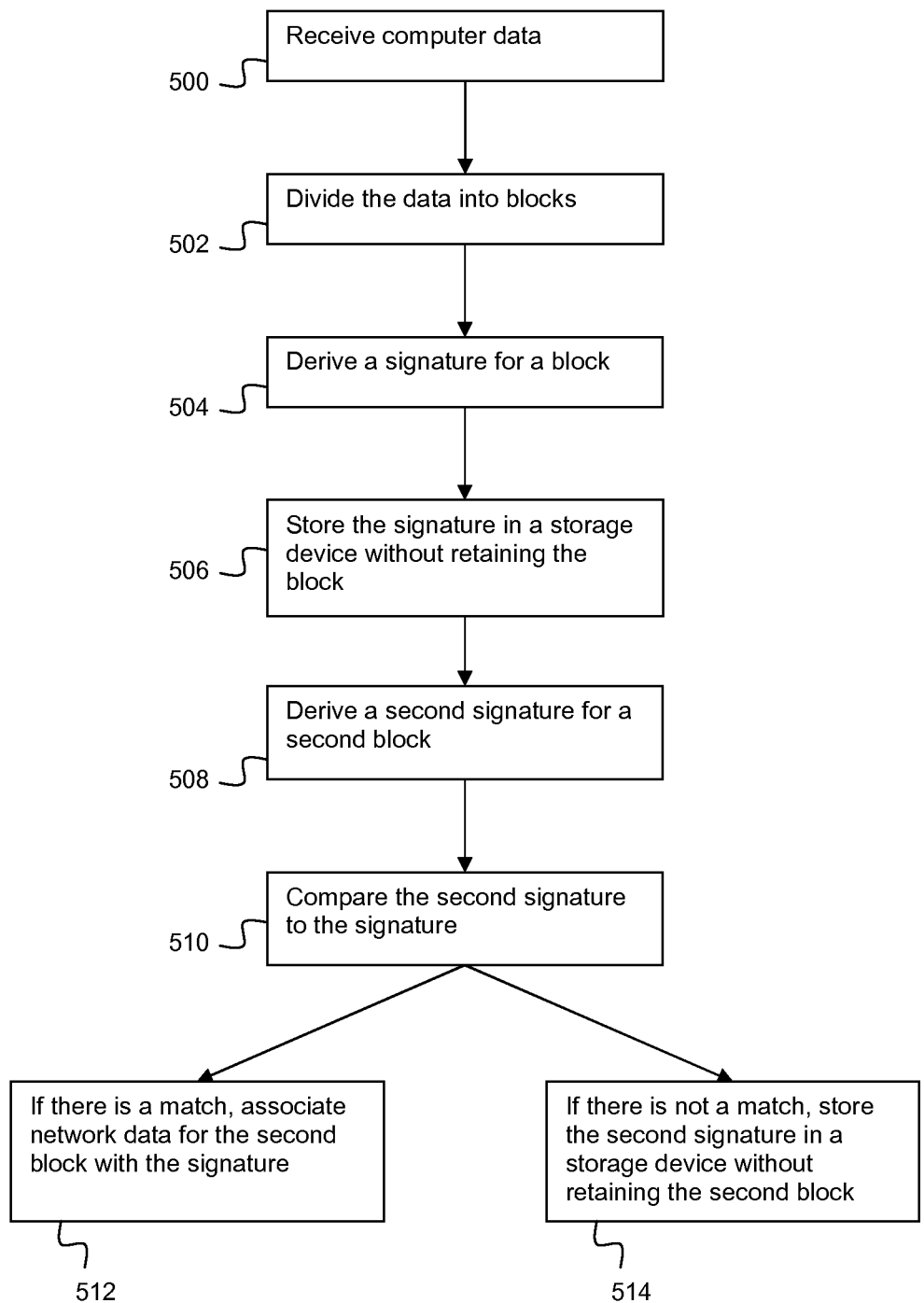
FIG. 5 is a flowchart illustrating a process for processing data in some embodiments of the invention.

FIG. 5 is a flowchart illustrating an embodiment of a process for processing computer data. In step 500, computer data is received. The data is then divided into blocks, step 502. A signature is then derived for each block, step 504. The signatures are then stored in a storage device without retaining the block, step 506. A second signature is derived for a second block, step 508. The two signatures are then compared to each other, step 510. If the signatures match, network data for the second block is associated with the signature, step 512. If the signatures do not match, the second signature is stored in a storage device without retaining the second block, step 514.

Figure 6:
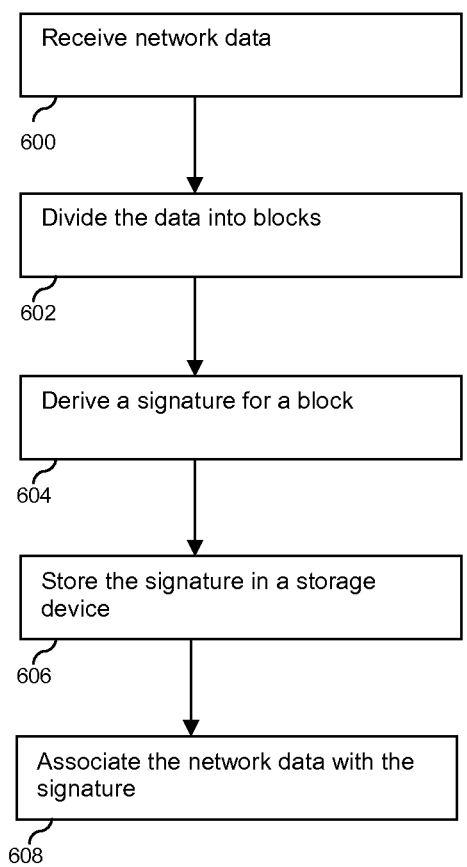
FIG. 6 is a flowchart illustrating a process for processing network data in some embodiments of the invention.

FIG. 6 is a flowchart illustrating an embodiment of a process for processing network data. In step 600, network data is received. The data is then divided into blocks, step 602. A signature is then derived for each block, step 604. The signatures are then stored in a storage device, step 606. The network data is then associated with the signature, step 608.

Figure 7:
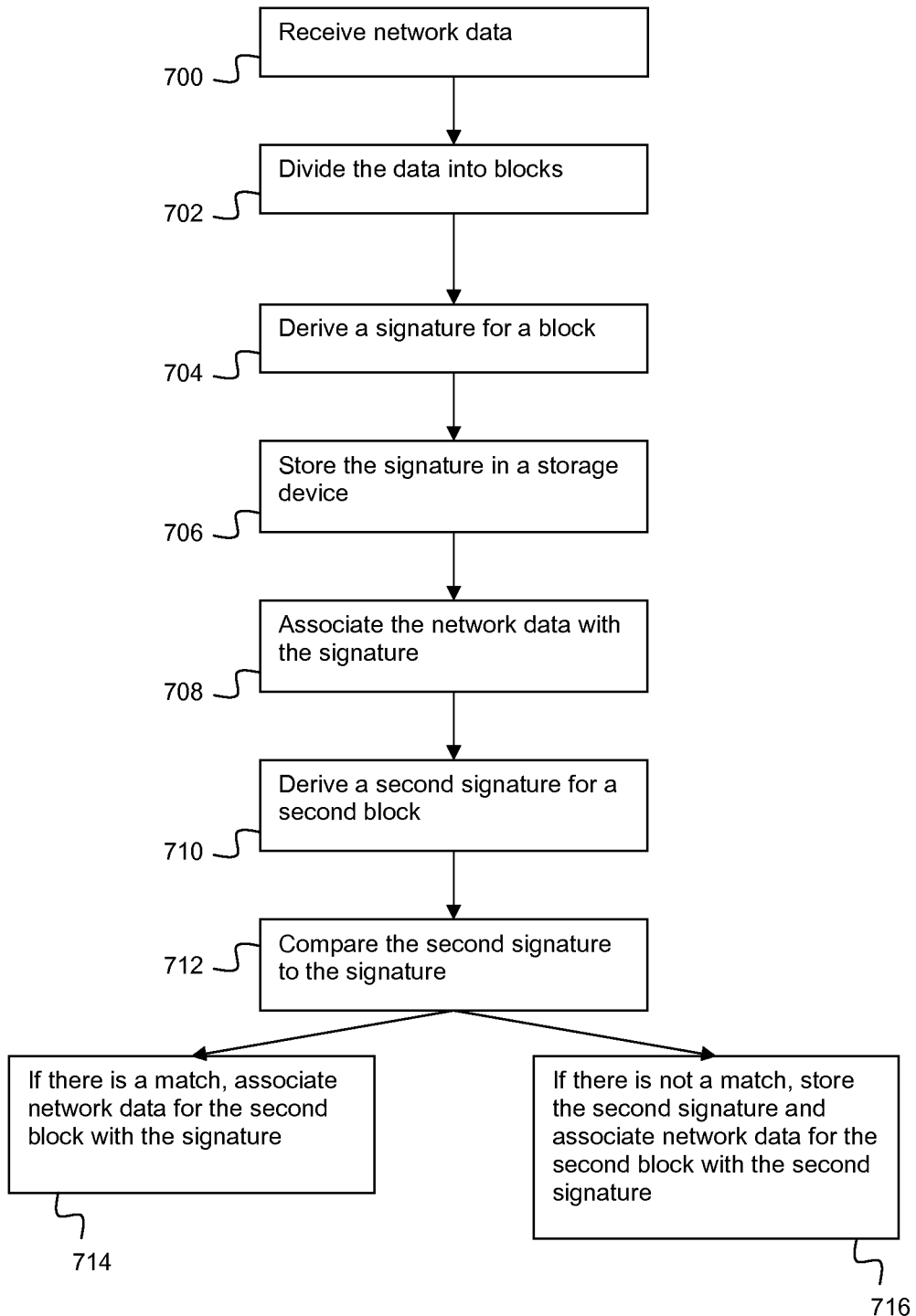
FIG. 7 is a flowchart illustrating a process for processing network data in some embodiments of the invention.

FIG. 7 is a flowchart illustrating an embodiment of a process for processing network data. In step 700, network data is received. The data is then divided into blocks, step 702. A signature is then derived for each block, step 704. The signatures are then stored in a storage device, step 706. The network data is then associated with the signature, step 708. A second signature is derived for a second block, step 710. The two signatures are then compared to each other, step 712. If the signatures match, network data for the second block is associated with the signature, step 714. If the signatures do not match, the second signature is stored, and network data for the second block is associated with the second signature, step 716.

Figure 8:
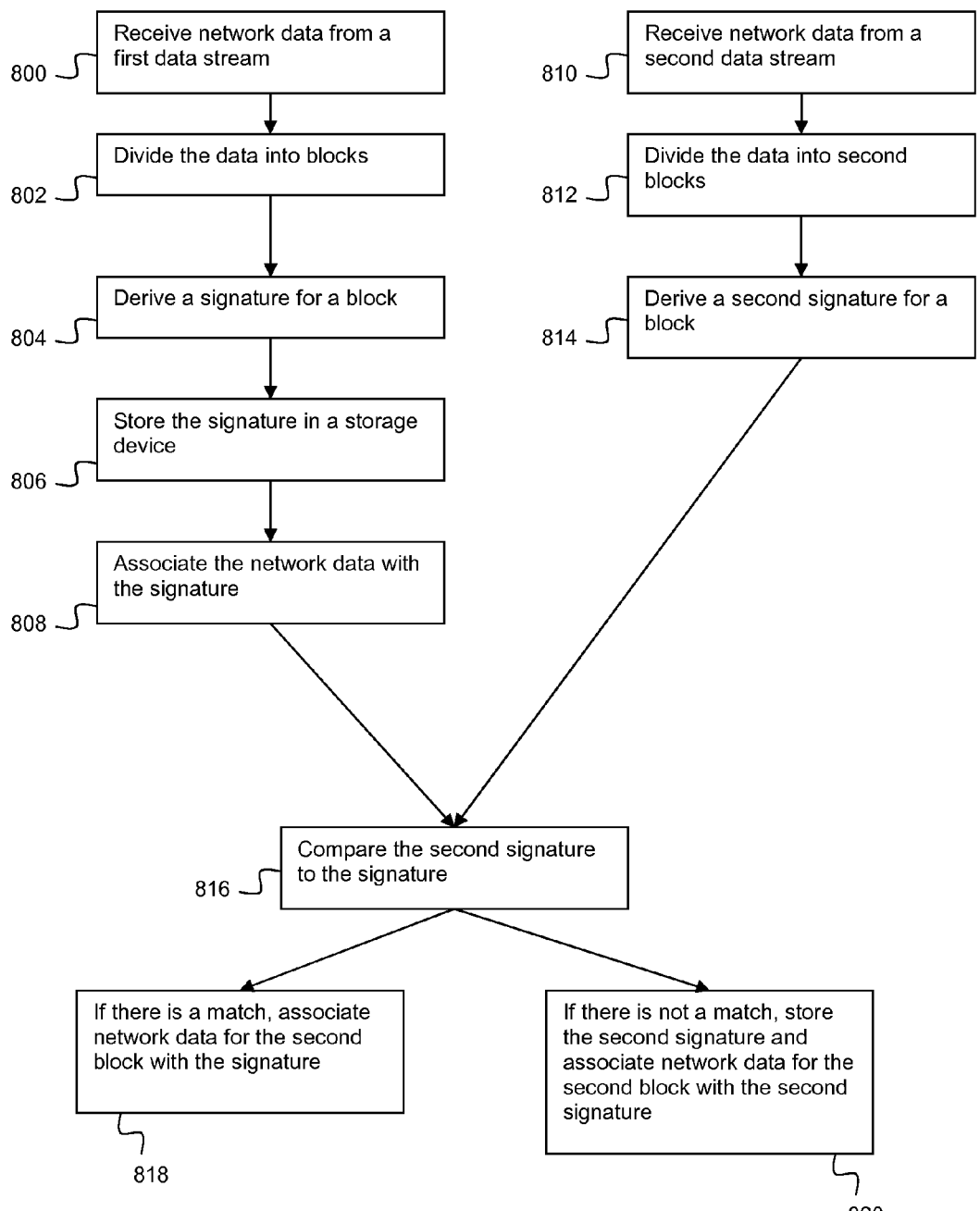
FIG. 8 is a flowchart illustrating a process for processing network data from two data streams in some embodiments of the invention.

FIG. 8 is a flowchart illustrating an embodiment of a process for processing network data from two data streams. In step 800, network data is received from data stream 1. The data is then divided into blocks, step 802. A signature is then derived for each block, step 804. The signatures are then stored in a storage device, step 806. The network data is then associated with the signature, step 808. Network data is received from data stream 2, step 810. The network data from data stream 2 is then divided into second blocks, step 812. A second signature is then derived for each second block, step 814. The signatures from the two data streams are then compared, step 816. If the signatures match, network data for the second block is associated with the signature, step 818. If the signatures do not match, the second signature is stored, and network data for the second block is associated with the second signature, step 820.

By retaining this information in this manner, it is possible to find stored data objects that have multiple references back to a plurality of sources. For example, a file is transferred from Alice to Bob. During the transfer, through commonality factoring, the file is segmented into blocks, the blocks are processed (such as by hashing), and the unique block signatures are stored in nonvolatile storage such as a storage device. Additional metadata (such as extrinsic data) and pointers for the other non-unique block signatures may be associated with the signatures, and may be stored together with the signatures or in a separate storage. A bit later, Bob transfers the same file to Chuck. During this transfer the same commonality factoring process occurs. Now, one copy of the file has been logged but it has three references to it. If we were to start with the same file as Alice and Bob and render it according to the methods of commonality factoring it would be possible to discover: 1) that others have a copy of this file, and 2) who has the other copy(ies) of the file.

This method would provide immediate visibility as to who holds a copy of the data without the need to search the data. This approach provides tremendous benefits because with one search of the database, it is possible to find every instance of a file or object within a vast network.

For the purposes of logging, the value of commonality factoring is its ability to create the database of file and sub-file data objects and their hashes and through this structure find the sources/owners of the data. This usage may be contrasted with the usage of commonality factoring for data reduction for storage and data transmission. In those use-cases, the primary objective is to store (or transmit) the data in a space or bandwidth reduced manner and then be able to reconstitute the data object to its original state. As applied to logging, commonality factoring is used to create a database of objects and from these objects, identify and/or locate the source of the data. Thus, given a data object it is possible to find its source.

Because both the source and the target of a network or data transmission are known, the metadata related to a processed data stream could preserve a record of both. In this manner, even if the receiver does not subsequently send the file, this "touch point" could be captured as well. This enables the discovery of all parties related to the data stream.

To find all identical data objects and their respective owners (point of origination), the system could simply search the database of commonality factored objects and locate their sources.

The methods described herein also facilitate searching for data objects that are not identical but similar. Such similarity may be defined by adjusting various search parameters. In the case of finding the owners (or source) of a specific file, the commonality factoring database could be searched for all references to the file's signature (which could be a hash, composite hash, or a sequence of hashes). The commonality factoring database could also be searched for sources of files (here "files" refers to any type of data object or set) that contain a high degree of overlap of content with a specified file. In some embodiments, a sample file may be rendered through the commonality factoring method. Its constituent hashes may used as the search terms for a search within the commonality factoring database. The results of the search may include all files that contain a 100% match of all the hashes, or may include all files with lesser degrees of hash matches. By adjusting the degree of hash matches, it is possible to adjust the degree of similarity of files reported. Generally, the greater the degree of similarity demanded the fewer matches that will be reported. Likewise, by specifying lesser similarity, more matches will be reported.

The number of hash matches is one way to define similarity. Another way of defining similarity is to search for hash matches that occur in a particular order within the source file or data object. Given search term hashes of "A," "B," and "C" a search is performed where only matches which contain "ABC" in that specific order are returned. Other files which contain the search terms "A," "B," and "C" but in varying orders will not be returned. For example, if "A," "B," and "C" are the search terms and the search term order is "ABC" then files with the search term order "ACB," "BAC," "BCA," "CBA", and "CAB" will not be returned even though they too contain the desired search terms. In some embodiments, the search term order can be specified so that the order is ignored, and the presence of the search term hashes within a data object would be sufficient to return a hit.

In some embodiments, similarity may be defined by hash matches that occur within a specified proximity to one another within the source file or data object. Given search term hashes of "A," "B," and "C" a search may be performed where only matches that contain the search terms within a specified number of blocks from each other. The number of blocks may be specified as a range or as an explicit number.

In the example given, the default inter-hash distance was zero, meaning that the searched for hashes are to appear contiguously. By specifying a range it is possible to include or exclude exact matches. In some embodiments, proximity of the hashes may be combined with the order of the hashes for further refinement. In this case, not only would the order of the hashes have to match but the hashes would also need to have an inter-hash distance that conforms to the search parameters.

In some embodiments, similarity may be defined by hash matches that occur where specific hashes are located in a specified position within the data object. Because each data object is rendered as a series of hashes in a specified order, a search may be made to find data objects which contain specified hashes at particular positions within the data object. This is similar to the previous search term order method but differs in that the order of the hashes is not the overriding determining factor for a match but rather it is the alignment of the position of the hash within the data object to the search criteria.

This method may be combined with the other two methods (search term order, and search term priority) to create more refined searches. Priority of terms could be specified which would then provide the opportunity for different search results. For example, search term order would run first, then search term proximity, and finally search term position. If the order of these were varied, it is possible that different results would be returned.

In addition to discovery of similar and exact matches of data objects and files, it is possible to discover all files and data objects sent or received by a specific person or system. An intrinsic attribute of the hash database is the possessor/holder (here "possessor" or "holder" do not refer to property ownership of the data but to control or possession of the data) of the data object. This starts at the atomic level where there are references to the file level and finally references to the data holder. By searching the hash database for all data objects which refer to a specific owner it is possible to locate all files and other data objects which share the same owner. The owner can be identified as a person/user or a system. Search for data ownership may be combined with the search for similarity and all of its variants. Through this combination it is possible to find the owners of data with high degrees of similarity or dissimilarity. This might, for example, be used to search for possible plagiarism.

In some embodiments, it may be desirable to identify files or data objects having sharing the highest degree of similarity. If each file is viewed as being made up of a number of data blocks, and each of these data blocks is viewed as an atomic element, then it would be possible to find all the other files which consist, in part, of the same atomic element. Since each atomic element has a reference to one or more higher-level files then it is possible to reference files according to their atomic element commonality. This may be contrasted with searching for files which contain like or similar data objects as described above in that the search does not begin with a reference file or data object.

In the case of searching for files which contain like or similar data objects, the starting point is a file or data object and the search uses the hashes from the starting file or data object as search terms for the search. With these hashes, files or data objects which contain some or all of these hashes are returned.

In the case of finding files or data objects that share the highest degree of similarity we are not starting with a file or data object as the reference point from which search-term hashes are derived. Instead, we are starting with the repository of atomic data elements. Based on the number of files or data objects referenced to each atomic data element it can be determined which files or data objects have the most commonality or similarity.

The system may determine which atomic elements have the most references from files/data objects. The system may also determine which atomic elements have the most references from files/data objects in common (i.e. Atomic-Data-Element-1 (ADE-1) has references from File-10, File-20, and File-30. ADE-2 also has references to File-10, File-20, and File-30 therefore ADE-1 and ADE-2 have a 100% match of file references).

In some embodiments, network traffic in its entirety (including payload) may be recorded and archived based on content derived data. A policy engine may be used to store and implement policies that direct the network traffic analysis system to take (or refrain from) certain actions. For example, if the traffic is encrypted, a policy could be used to trigger recording of the entire traffic. This may be legally allowable because the traffic's content is not viewable to anyone without the decryption key. This key may be stored in a location apart from the stored traffic, such as for legal reasons. The key storage location may be one not under direct control of investigative or law enforcement agencies, so that a court order or authorization (which could require probable cause or a reasonable suspicion) would be required to view the stored traffic.

There may be value in keeping this traffic for forensic purposes, and it may serve as evidence. At the most basic level, portions of the traffic may have been rendered as a file on the user's computer. Also, based on other evidence and cause, the monitoring agency may obtain legal permission to view the user's private data. In such cases, it may be possible to compel the key holder (which could be the user or a third party such as a service provider; e.g., Yahoo Instant Messenger) to provide the key in order to decrypt the recorded data traffic. This could then be compared to the file on the user's computer.

Figure 9:
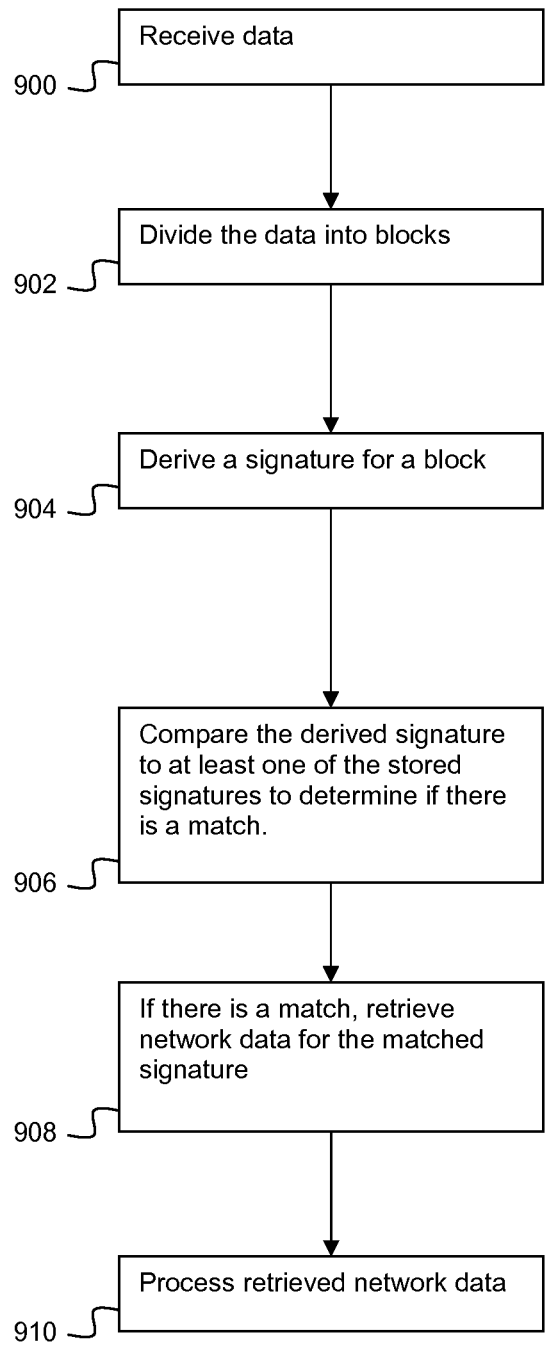
FIG. 9 is a flowchart illustrating a process for analyzing data in some embodiments of the invention.

FIG. 9 is a flowchart illustrating an embodiment of a process for analyzing data in a system having stored signatures derived from blocks of data and network data associated with the signatures. In step 900, data is received. The data is then divided into blocks, step 902. A signature is then derived for each block, step 904. The derived signature is then compared to at least one of the stored signatures to determine if there is a match, step 906. If there is a match, network data for the matched signature is retrieved, step 908. The network data for the matched signature is then processed, step 910.

Various methods and formats may be used for logging data derived from the network traffic and identified at various locations. In some embodiments, the log may include a database. The database may be used to contain records where each record could contain the traffic file itself (such as a .cap, .pcap file, etc.) and all the relevant data (such as hashes) as well as additional data derived and/or extracted from the traffic itself so that the record can be easily searched. In some embodiments, a less structured approach may be used, with a plurality of files or objects associated by a naming scheme or other methods of organization. The goal would be to be able to search through the logs and identify and correlate all the relevant elements.

Thus, in some embodiments, the system has the ability to capture data in a manner that informs an observer of the characteristics of the data without revealing the specific content of the data or the explicit identity of the communicators but retains investigative value. Sniffer files or other such log files may simply be raw traffic presented in per-packet fashion and when possible with known protocol and payload fields decoded. Sniffer files might contain the exact content of the communication, which could be problematic from a privacy standpoint. Keeping these might violate the privacy of the originator and therefore not be permitted as a logging scheme. On the other hand, investigators are allowed to know the identity of the ISP customer and can presumably identify the identity of the remote parties in multiparty communications. The allowed information is not anonymous but it is thus limited due to the need to preserve the identity of the parties. Some approaches may classify and search for traffic that would be of interest to an investigator, to provide information such as descriptions of the types of communications, the types of data being communicated, the anonymous characteristics of participants in a communication, the possible location of the participants, and the specific identity of specific data files and objects without necessarily disclosing the content of the file or object at all. Information such as hash of the files/objects, location information, speaker identity templates, etc. could be retained.

For example, by having the hash of a particular file or a constituent hash for a block deemed "interesting", investigators can use this hash to trace/track its movement and sharing. Music files or porn files could be identified as having come from one person and then transmitted to another and then to another and so on. At some point the investigator may obtain permission to inspect a subject's computer, take an inventory of files and data objects, and generate their hashes. This inventory can be compared to the database/log of traffic created by the network traffic monitoring system. If there is a match between the hashes one would then know the transmission path (chain of custody) and the timeline of custody of the files/objects. The use of the system with hash values and other data in anonymous form facilitates this while complying with privacy requirements.

The subject matter disclosed herein may additionally or alternatively monitor and/or analyze surveillance data. This surveillance data may be stored anonymously until a need to disclose the information arises. For example, a traffic camera may record license plate information from passing vehicles. After recording a license plate, the information could be processed to generate a unique signature. Extrinsic information, such as time and location, may be associated with the signature and the rest of the surveillance information could be discarded. In an embodiment, the resulting time/location stamped signatures may be stored without any identifying information, such as the license plate number. At a later time there may be a reason for unveiling the stored information. For example, police may have license plate information from a car used to commit a crime and want to determine where else that car has been. In an embodiment, the identifying license plate information could be processed by the same algorithm as the surveillance data to generate a second signature. This second signature may be compared to all of the stored signatures and, if a match occurs, extrinsic information associated with the first signature may be extracted. In this manner, the police could determine everywhere the car has been, but only if they have a reason to do so. Without the information obtained from the car, all of the stored signatures may remain completely anonymous.

Figure 10:
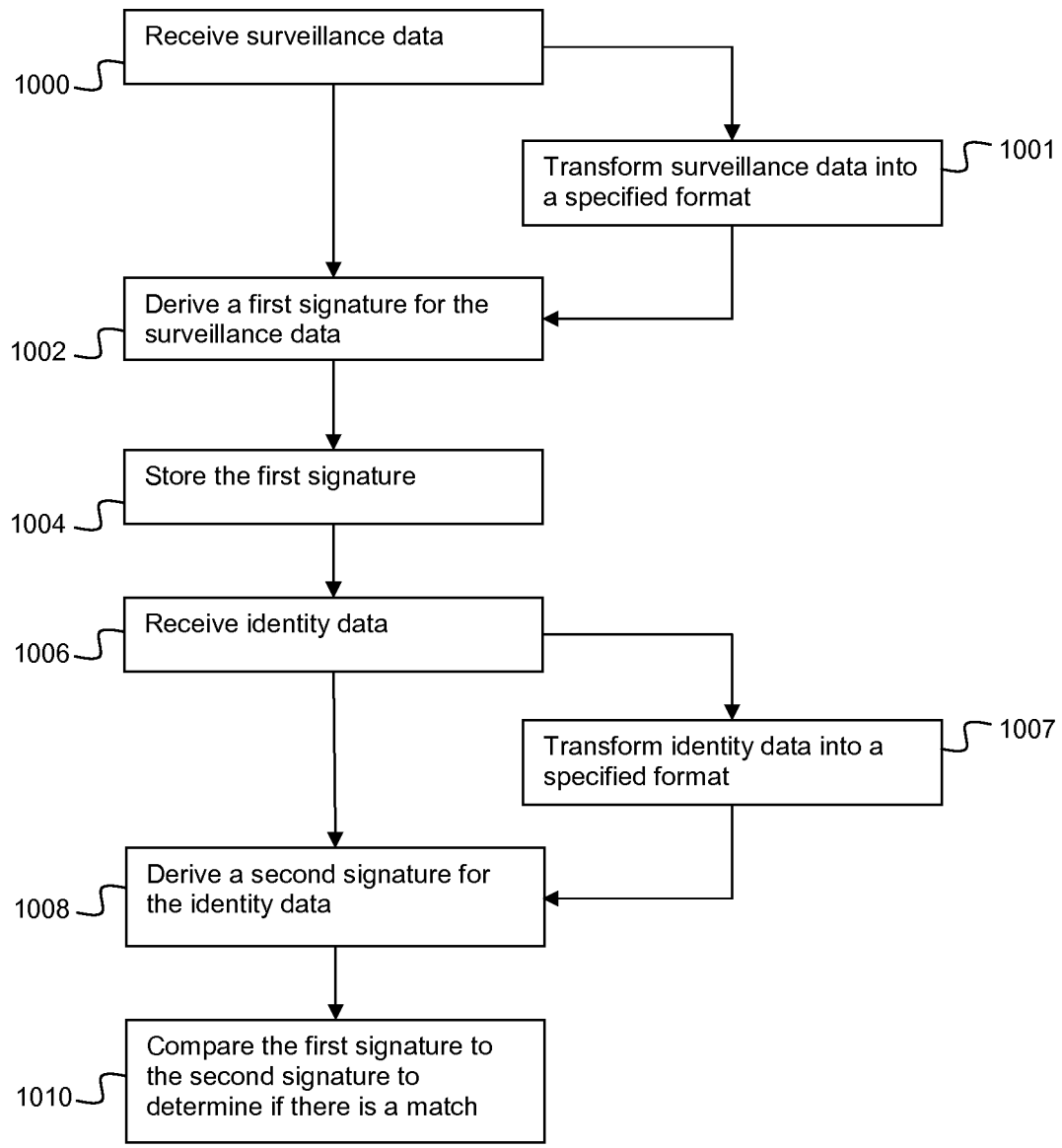
FIG. 10 is a flowchart illustrating a process for processing surveillance and identify data in accordance with some embodiments of this disclosure.

FIG. 10 is a flowchart depicting a process for storing surveillance data in an anonymous form. This process may be substantially similar to those discussed above, but applied to surveillance data instead of or in addition to network data.

At step 1000, surveillance data is received by the system. This data could be, for example, license plate information.

At 1001, the surveillance data is transformed into a specified format. The step may be performed by any technology capable of converting information to a common format. For example, license plate characters may be converted to text using a technology such as OCR. This transformation may aid in later identification by reducing hash signature mismatches due to information format discrepancies, including image resolution or camera angle. In an embodiment, transformation 1001 is not performed and the process proceeds directly from 1000 to 1002.

At 1002, a signature is derived for the data. For example, the surveillance data may be processed by a hashing algorithm to generate a hash signature. If transformation 1001 was performed, the signature may be derived from the data as it exists in the specified format. For example, if the data was transformed into plain text the signature may be derived from that plain text and not from the surveillance data as it was received. In an embodiment, the surveillance data is first divided into multiple data blocks and a hash is generated for each block. At block 1004, the derived signature may be stored for future comparison.

At 1006, the process may receive identification data. This data may comparable to the surveillance data. For example, if the surveillance data was license plate information, the identity data may also be license plate information.

At 1007, the identification data may be transformed into a specified format. In an embodiment, the format is the same as that used in block 1001. For example, if the surveillance data was converted into text using OCR in 1001, the identification data may also be converted into text using OCR or a similar technology. As in 1001, any technology capable of converting data into a common format may be used in block 1007. In an embodiment, the identification data is not transformed and the process proceeds from block 1006 to 1008.

A second signature is derived for the identity data at block 1008, and at 1010 the system compares the first and second signature to determine if there is a match. If the identification data was transformed into a specified format at 1007, the second signature may be derived from that format rather than from the data as it was received. A match could indicate, for example, that both the identity data and the surveillance data are the same.

Figure 11:
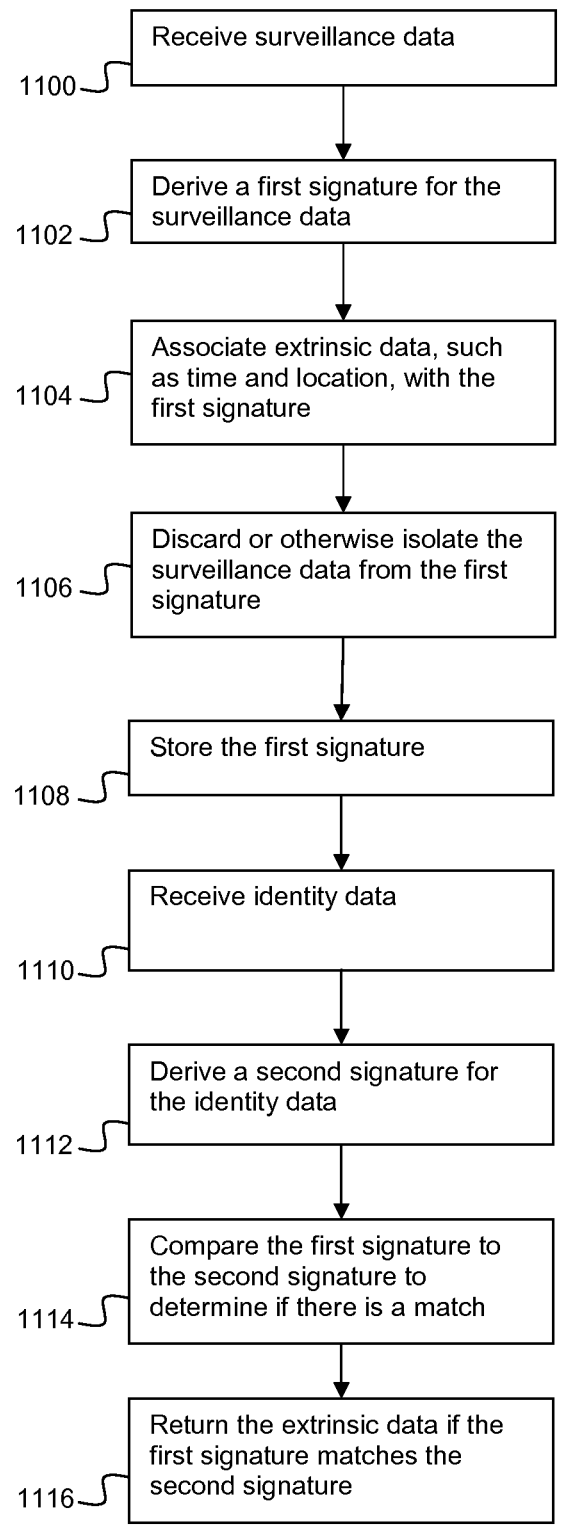
FIG. 11 is a flowchart illustrating a process for isolating surveillance data from a signature while also associating extrinsic information with the signature.

Turning now to FIG. 11, a process is disclosed for associating extrinsic information with stored surveillance signatures. At 1100, surveillance data is received and a signature is derived at 1102. In an embodiment, this may be similar to the method discussed in reference to FIG. 10. At 1104, extrinsic data may be associated with the first signature. This data may comprise any information unique from the data itself, and in an embodiment is not identifying information. For example, the extrinsic information may include a time and location. At block 1106 the surveillance data is isolated from the first signature. In an embodiment, this may occur by discarding or deleting the surveillance data. Additionally or alternatively, the surveillance data may be stored in a database physically or logically isolated from the signature. At block 1108, the first signature is stored. In an embodiment the signature may be stored with the associated extrinsic evidence, which may aid future identification efforts.

Figure 12:
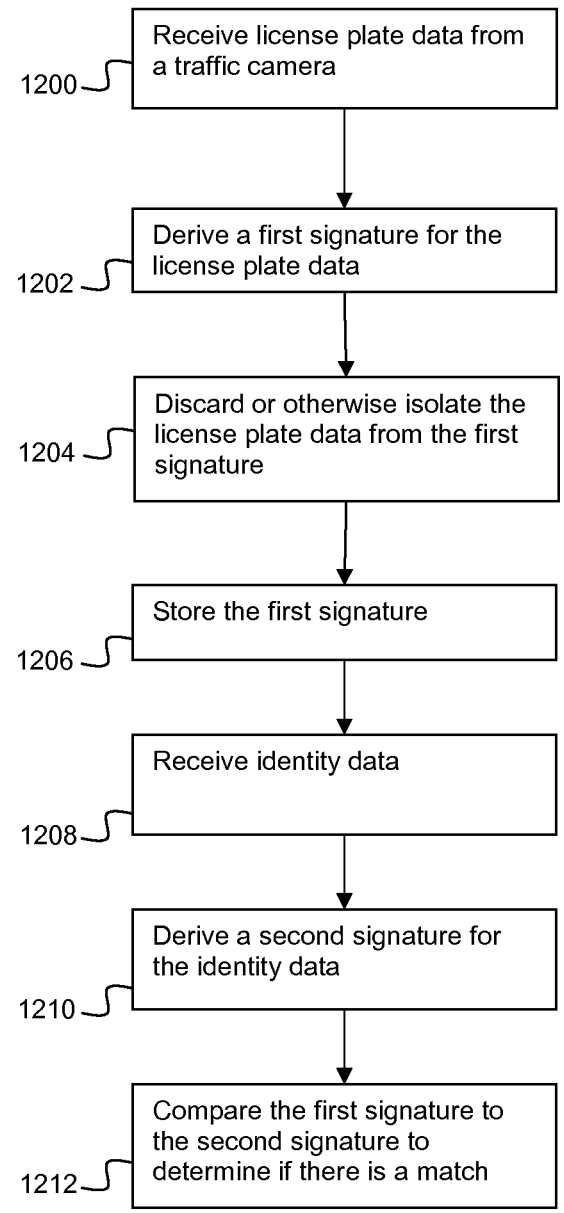
FIG. 12 is a flowchart illustrating a process similar to FIG. 10 where the surveillance data is from a traffic camera.

At block 1110, identity data is received, and a second signature is derived at 1112. At 1114, the second signature may be compared to one or more stored signatures to determine if there is a match. In an embodiment, steps 1110-14 are substantially similar to those discussed in reference to FIG. 10. If a match is found at 1114, block 1116 may return extrinsic data associated with the stored signature. This may allow the system to associate the identity data with extrinsic information stored on the system. In an embodiment, extrinsic information cannot be associated with an identity unless that identity is submitted to the system FIG. 12 illustrates an embodiment consistent with the present disclosure. At 1200, license plate information may be received. This information could be, for example, recorded by a traffic camera. In an embodiment, optical character recognition (OCR) may be used to record the license plate information. Additionally or alternatively, a traffic camera at a given location may record the license plate information from every car that passes. At 1202 a signature may be derived for each of these license plates, and the license plate data may be discarded or otherwise isolated from the signature at 1204. At 1206, the first signature may be stored. In an embodiment, extrinsic data associated with the signature may also be stored. For example, the extrinsic data may include the time the license plate data was captured and the location. Location could be identified, for example, based on intersection, GPS coordinates, or a camera identification number.

At 1208 identity data may be received. For example, if a car is suspected to have been used in a crime, the police or another appropriate official may submit license plate information to the system. At 1210 a second signature is derived and compared to the first signature at 1212. If there is a match between the signatures, any associated extrinsic data may be retrieved. This data may be used to identify the car's location at a given time, and could be used to associate the car with a crime. In an embodiment, the identity data may only be submitted after a proper warrant is issued. This may alleviate privacy concerns associated with maintaining a database of vehicle location information.

In an embodiment, signatures identified as suspicious may have their identity or extrinsic information revealed. The system may monitor the signatures for unusual trends which may indicate potential illegal or suspicious activity. For example, an unknown vehicle repeatedly circling a residential block may indicate someone casing homes for burglary. If the vehicle's hashed license plate information is known to be a resident of the area, however, the unusual activity may be considered less suspicious. In an embodiment, a user may instruct the system to identify any other trend which may or may not be considered suspicious.

Figure 13:
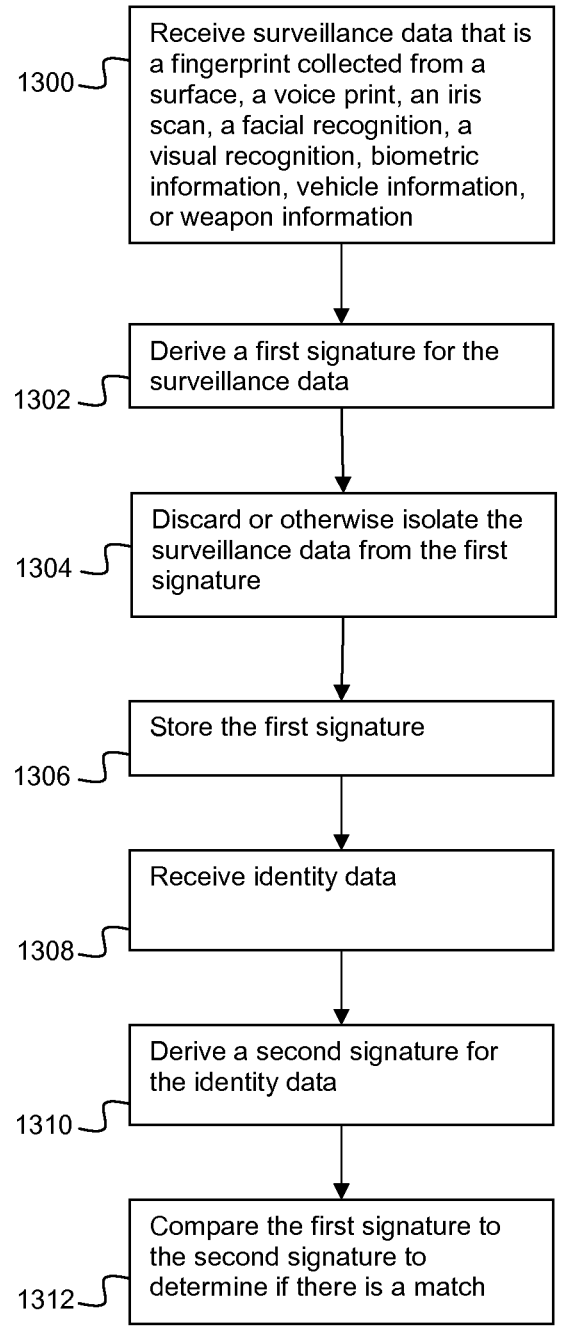
FIG. 13 is a flowchart illustrating a process similar to FIG. 10, where the surveillance data may be a variety of information.

FIG. 13 illustrates an additional or alternative embodiment. At 1300, one or more of a variety of surveillance data types are received. For example, this data may include fingerprint data collected from a surface. In an embodiment, fingerprints may be regularly retrieved from a public or private surface. The surface may or may not be cleaned after collecting the fingerprints. At 1302 signatures may be derived for collected fingerprints and at 1304 the fingerprint data may be discarded. At 1306 the signatures may be stored with the appropriate extrinsic data in a database. At 1308 the system may receive identity data comprising fingerprints. The identity data may be hashed at 1310 and at 1312 the database may be searched for any matches.

In an embodiment, a person's identity may only be connected to the collected fingerprints pursuant to a valid arrest. At the time of arrest, fingerprints may be taken and the database may be searched. This may protect the anonymity of all the fingerprints in the database, unless there is a need to identify an individual. Additionally or alternatively, if fingerprint data is discarded at 1304, it may be impossible or difficult to associate fingerprints with an individual without having access the individual's person. Such an association may require some form of access to the individual or their fingerprints, and the anonymity of the stored data may therefore be preserved. This may alleviate privacy concerns associated with maintaining a database of fingerprints.

In an embodiment, a variety of other surveillance information may be received at 1300. This information may include voice prints, iris scans, facial recognition data, biometric information, vehicle information, weapon information, credit card data, or maps including those provided by services such as Google Earth.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method, comprising:
receiving surveillance data;
deriving a first signature for the surveillance data;
storing the first signature;
associating extrinsic data with the first signature;
storing the extrinsic data separate from the surveillance data;
receiving identity data;
deriving a second signature for the identity data;
comparing the first signature to the second signature to determine if there is a match;
if the first signature matches the second signature, associating the identity data with the extrinsic data associated with the first signature, wherein the extrinsic data comprises a time the surveillance data was recorded, and a location at which the surveillance data was recorded, and the storing the extrinsic data separate from the surveillance data comprises:
deleting the surveillance data; and
storing the first signature and the extrinsic data comprising the time and the location in a database, wherein the first signature is stored in the database comprising a plurality of additional signatures derived from additional surveillance data; and
identifying a signature trend from the database, wherein the signature trend is identified as suspicious based on a number of times the second signature matches the first signature.

2. The method of claim 1, wherein the surveillance data is isolated from the first signature.

3. The method of claim 1, wherein the surveillance data comprises license plate information.

4. The method of claim 3, wherein the license plate information is collected from a camera.

5. The method of claim 1, wherein the surveillance data comprises finger print data.

6. The method of claim 5, wherein the fingerprint data is collected from a surface.

7. The method of claim 1, wherein the surveillance data is at least one of a voice print, an iris scan, a facial recognition, a visual recognition, biometric information, vehicle information, or weapon information.

8. The method of claim 1, wherein the extrinsic data includes time information and location information.

9. The method of claim 1, further comprising returning the extrinsic data if the first signature matches the second signature.

10. The method as recited in claim 1, wherein deriving the first signature comprises performing a cryptographic algorithm on the surveillance data.

11. The method as recited in claim 1, wherein deriving the first signature comprises performing a hash function.

12. The method as recited in claim 11, wherein the first signature comprises a hash value.

13. The method of claim 1, further comprising deriving the extrinsic data from the surveillance data based on parameters associated with the surveillance data.

14. A system, comprising:
a non-transitory storage device comprising a plurality of signatures derived from surveillance data; and
a processor configured to:
receive the surveillance data;
derive a first signature for the surveillance data;
store the first signature;
associate extrinsic data with the first signature;
store the extrinsic data separate from the surveillance data;
receive identity data;
derive a second signature for the identity data;
compare the first signature to the second signature to determine if there is a match;
if the first signature matches the second signature, associate the identity data with the extrinsic data associated with the first signature, wherein the extrinsic data comprises a time the surveillance data was recorded, and a location at which the surveillance data was recorded, and the storage of the extrinsic data separate from the surveillance data comprises:
deletion of the surveillance data; and
storage of the first signature and the extrinsic data comprising the time and the location in a database, wherein the first signature is stored in the database comprising a plurality of additional signatures derived from additional surveillance data; and
identify a signature trend from the database, wherein the signature trend is identified as suspicious based on a number of times the second signature matches the first signature.

15. The system of claim 14, wherein the processor is further configured to if there is not a match between the second signature and a signature of the plurality of signatures, store the second signature.

16. The system of claim 15, wherein the processor is further configured to if there is not a match between the second signature and a signature of the plurality of signatures, delete the identity data.

17. A computer program product, comprising a non-transitory computer usable medium having machine readable code embodied therein for:
receiving surveillance data;
deriving a first signature for the surveillance data;
storing the first signature;
associating extrinsic data with the first signature;
storing the extrinsic data separate from the surveillance data;
receiving identity data;
deriving a second signature for the identity data;
comparing the first signature to the second signature to determine if there is a match;
if the first signature matches the second signature, associating the identity data with the extrinsic data associated with the first signature, wherein the extrinsic data comprises a time the surveillance data was recorded, and a location at which the surveillance data was recorded, and the storing the extrinsic data separate from the surveillance data comprises:
deleting the surveillance data; and
storing the first signature and the extrinsic data comprising the time and the location in a database, wherein the first signature is stored in the database comprising a plurality of additional signatures derived from additional surveillance data; and
identifying a signature trend from the database, wherein the signature trend is identified as suspicious based on a number of times the second signature matches the first signature.

* * * * *